United States Patent [19]

Emter

[11] Patent Number: 5,503,046

[45] Date of Patent: Apr. 2, 1996

[54] BANDSAW INDEXING APPARATUS

[76] Inventor: James Emter, 2007 NW. 267th Cir., Ridgefield, Wash. 98642

[21] Appl. No.: 269,606

[22] Filed: Jul. 1, 1994

[51] Int. Cl.$^6$ .................................................. B23D 63/00
[52] U.S. Cl. ................................................ 76/77; 76/43
[58] Field of Search ........................... 76/43, 37, 75–77, 76/25.1, 112

[56] References Cited

U.S. PATENT DOCUMENTS

| 2,477,880 | 8/1949 | Kershaw et al. | 76/77 X |
| 4,023,446 | 5/1977 | Annas et al. | 76/77 X |
| 5,088,358 | 2/1992 | Emter | 76/75 |
| 5,152,193 | 10/1992 | Emter | 76/41 |

FOREIGN PATENT DOCUMENTS

| 177068 | 5/1953 | Austria | 76/43 |

*Primary Examiner*—Douglas D. Watts
*Attorney, Agent, or Firm*—Chernoff, Vilhauer, McClung & Stenzel

[57] ABSTRACT

An indexing system for use in a bandsaw sharpening machine which includes at least one grinding wheel for engaging the teeth of a bandsaw blade. An indexing block slideably disposed with respect to the bandsaw blade end has a pawl for engaging the blade to push it in a forward direction while friction pads inside the block frictionally engage the sides of the bandsaw blade. A wire link reciprocally moves the indexing block with a forward stroke pushing a tooth past an index finger. The index finger drops into the path of the tooth after the forward stroke and a reverse stroke is initiated pulling the block and blade back against the finger so as to hold the blade stationary as the wire link retracts the indexing block. The friction pads allow the block to slide along the blade to its initial position to ready it for the next forward stroke.

6 Claims, 5 Drawing Sheets

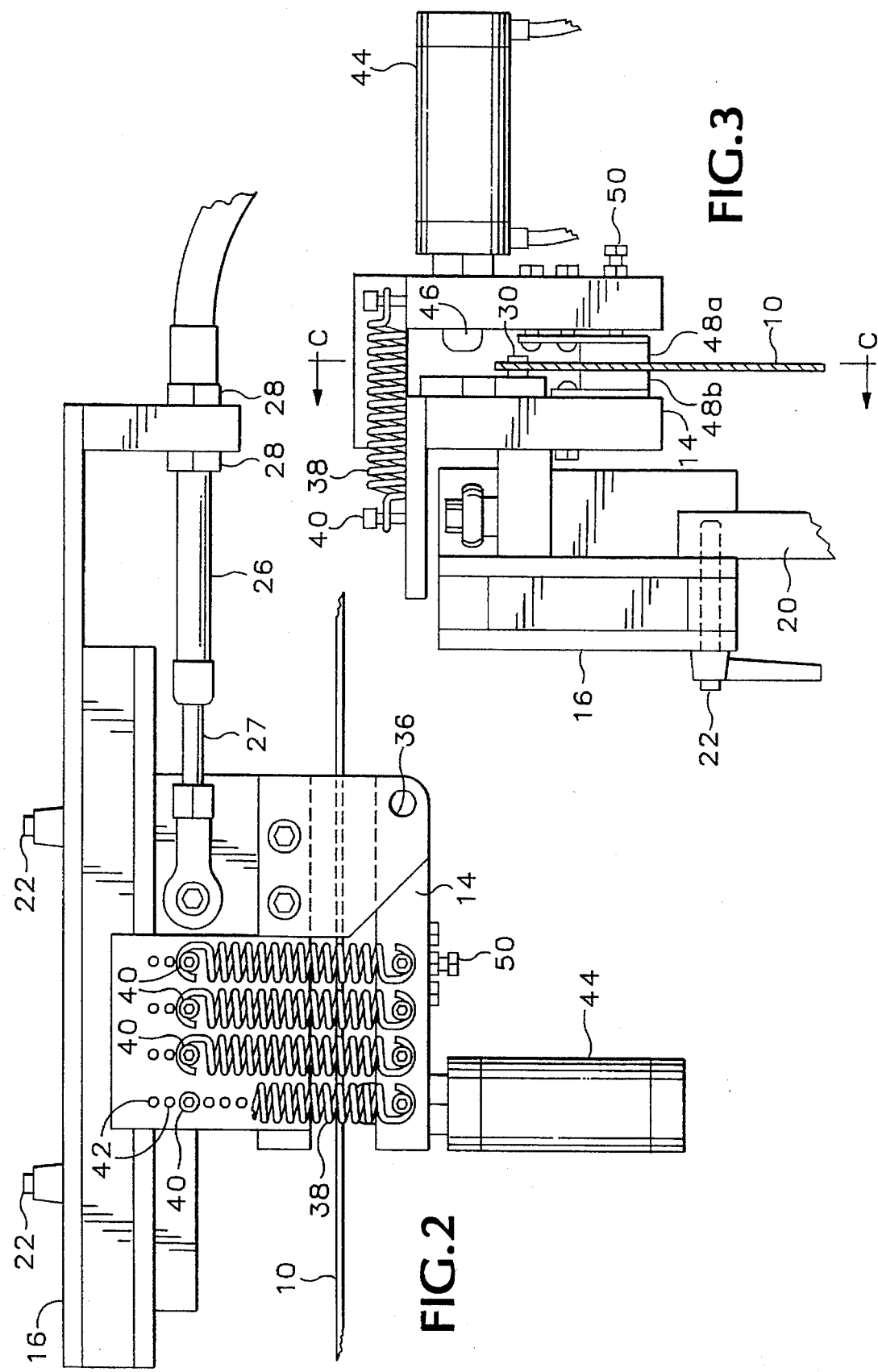

5,503,046

BANDSAW INDEXING APPARATUS

BACKGROUND OF THE INVENTION

The following invention relates to a bandsaw sharpening machine and in particular to an indexing system to be used with this type of machine to advance the bandsaw one tooth at a time and hold it in position for a regrinding operation.

Bandsaw blades of the type that are frequently used in lumber mills consist of large steel loops having carbide tipped teeth forming an outer edge of the steel band. Periodically such bandsaw blades must be resharpened, and there exist sharpening machines which regrind bandsaw blades a tooth at a time. Typically the bandsaw blade is placed within an oval series of guides or tracks and advanced one tooth at a time relative to a pair of side grinding wheels, or a top and face grinding wheel, for a resharpening operation. Once all of the teeth of the blade have passed through the grinding station, the sharpening operation is complete. Such machines typically advance the blade by using a ratchet or a pawl which engages the scalloped areas of the teeth and pushes the blade in a forward direction. The problem with such devices is that the indexing pawl is highly inaccurate. The teeth are not placed in the proper position in the path of the grinding wheels and this results in inaccuracies in machining. Additionally, with a typical regrinding machine, there is nothing to hold the blade still except for the weight of the blade itself in the guide or track while the grinding wheels engage a tooth. For accurate grinding, however, it is essential that the blade be advanced to the precise position required for engagement by the grinding wheels, and that once in position, the blade be kept perfectly still while the grinding operation takes place.

SUMMARY OF THE INVENTION

The invention herein comprises an indexing system for use in a bandsaw sharpening machine which includes at least one grinding wheel for engaging the teeth of a bandsaw blade. An indexing block slideably disposed with respect to the bandsaw blade has a pawl for engaging the blade to push it in a forward direction, and friction pads for frictionally engaging the sides of the bandsaw blade. Link means reciprocally moves the indexing block with a forward stroke pushing a tooth past an index finger. The index finger drops into the path of the tooth after the forward stroke and a reverse stroke is initiated pulling the blade back against the finger so as to hold the blade stationary as the link means retracts the indexing block.

The friction pads engage the blade tightly enough so that on the reverse stroke the pads pull the blade into tight engagement with the index finger that had dropped behind a saw blade tooth on the forward stroke of the indexing block. When the indexing block is retracted, the friction pads pull the saw blade back against the indexing finger tightly thus holding the blade in precise position for a grinding operation.

The friction pads, which face each other on the inside of the indexing block, are adjustable. Furthermore, the indexing block comprises two pieces of metal joined together by a swivel joint and springs may be used connecting one piece to the other to provide the right degree of stiffness for the clamping force of the friction pads. The indexing block moves reciprocally along slots in a frame which is attached to the guide (or the sharpening machine proper) containing the bandsaw blade. A wire link, push rod or the like may be used to move the indexing block back and forth to provide the reciprocal motion that alternately advances the saw blade and pulls it back hard against the index finger to position each tooth for grinding.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a top view taken along line A—A of FIG. 1.

FIG. 3 is a front view taken along line B—B of FIG. 1.

Figure 1:
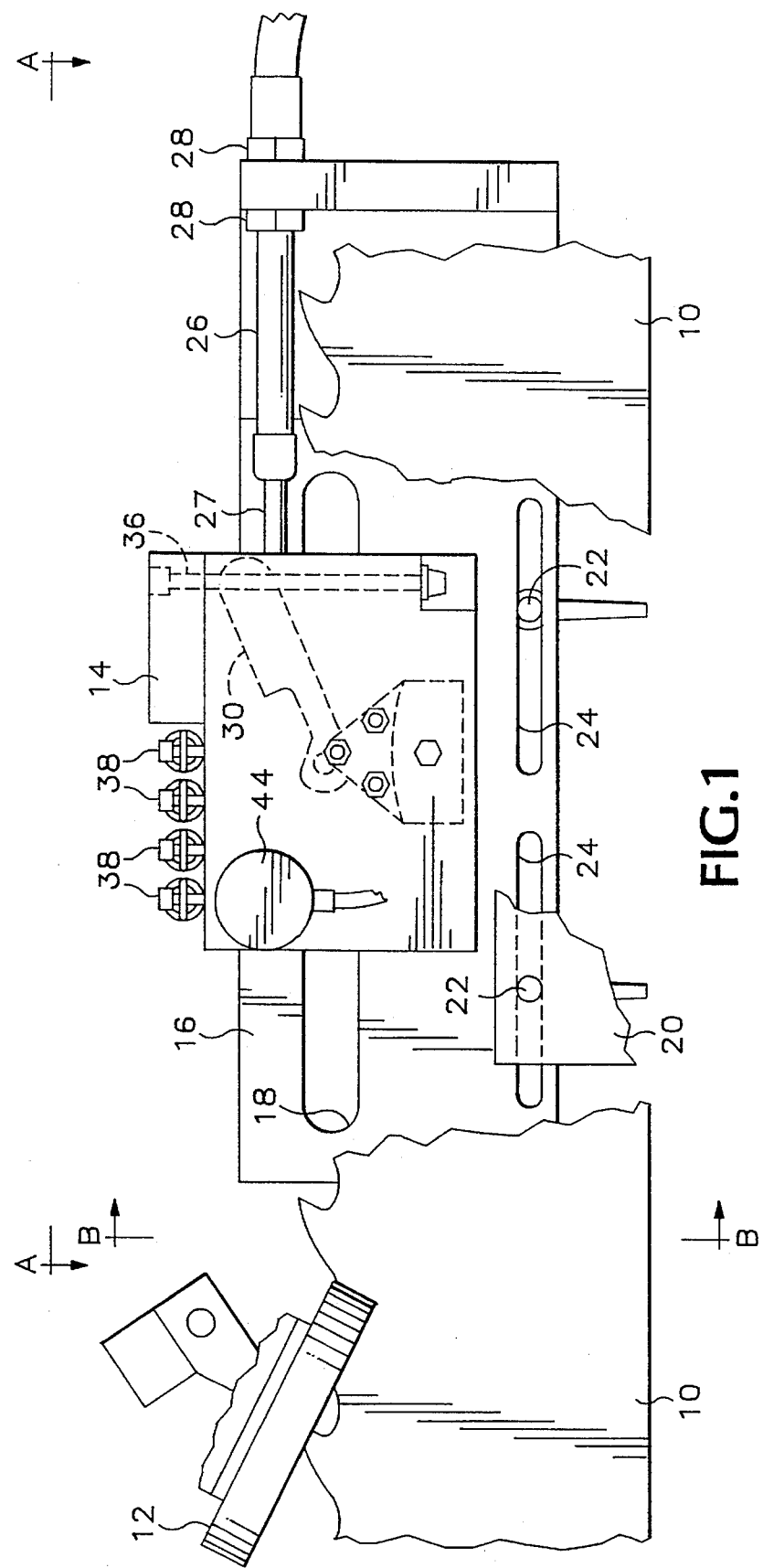
FIG. 1 is a partial side cutaway view of the indexing block of the invention including a partial view of the bandsaw blade and grinding wheels.

DETAILED DESCRIPTION OF THE PREFERRED EMBODIMENT.

A saw blade 10, which is a bandsaw blade, is held within a guide or track 20 permitting motion in a continuous loop so that each tooth of the saw blade 10 may be sharpened in turn by grinding wheels 12. In the particular embodiment as shown, the sharpening mechanism is a dual wheel side grinder of the general type shown in U.S. Pat. No. 5,088,358. This is a conventional dual side grinder and as such the grinding wheels move with a reciprocal grinding stroke under the control of motors and linkages (not shown). The details of such machines are unimportant for the purposes of the invention herein, it being recognized that the indexing system of the present invention can work with any conventional grinder.

An indexing block 14 is mounted on a frame 16 which has a cutout track 18 that permits the indexing block 14 to move back and forth. The frame 16 is in turn affixed to the guide or track 20 holding the saw blade 10 with bolts 22 that are inserted through slots 24 which provide lateral adjustability for the frame 16 along the track or guide 20.

The indexing block 14 is driven with a reciprocating motion along the track 18 by a wire link 26. The wire link 26 is a stiff cable that is fastened to the frame 16 by nuts 28. The wire link is of the type shown in U.S. Pat. No. 5,152,193 and is a flexible steel rod whose reciprocal motion is controlled by a lever coupled to a cam or the like (not shown) which is in turn synchronized with the motion of the grinding wheels 12.

Figure 4:
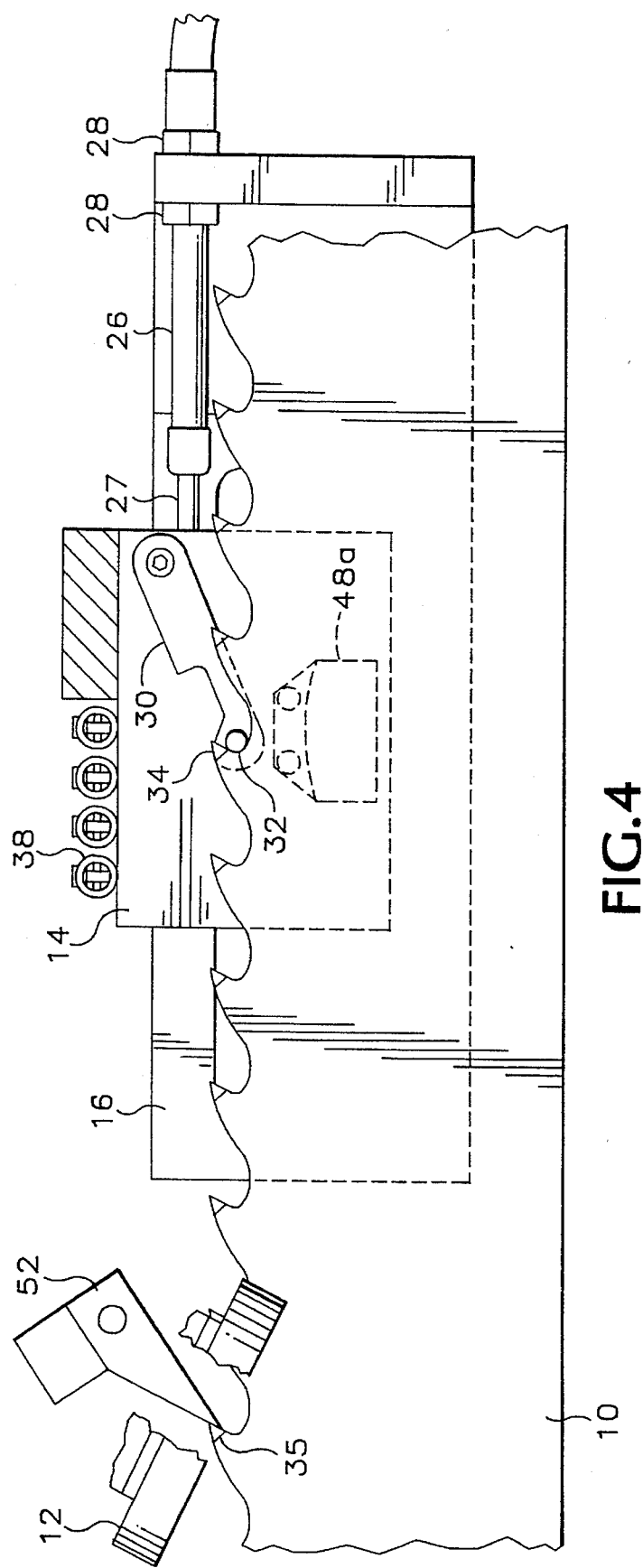
FIG. 4 is a partial side cutaway view taken along line C—C of FIG. 3.
Figure 5:
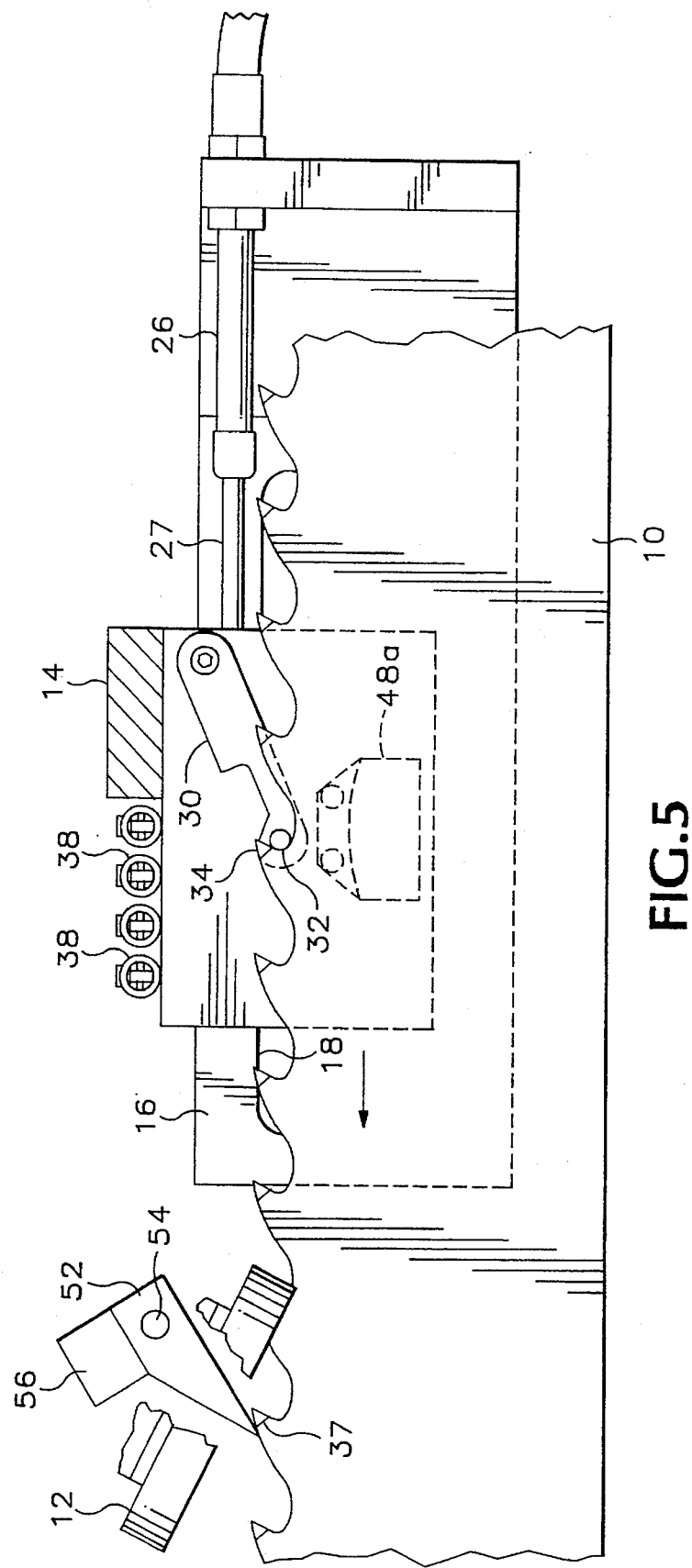
FIG. 5 is a view similar to FIG. 4 showing the forward stroke of the indexing block.
Figure 6:
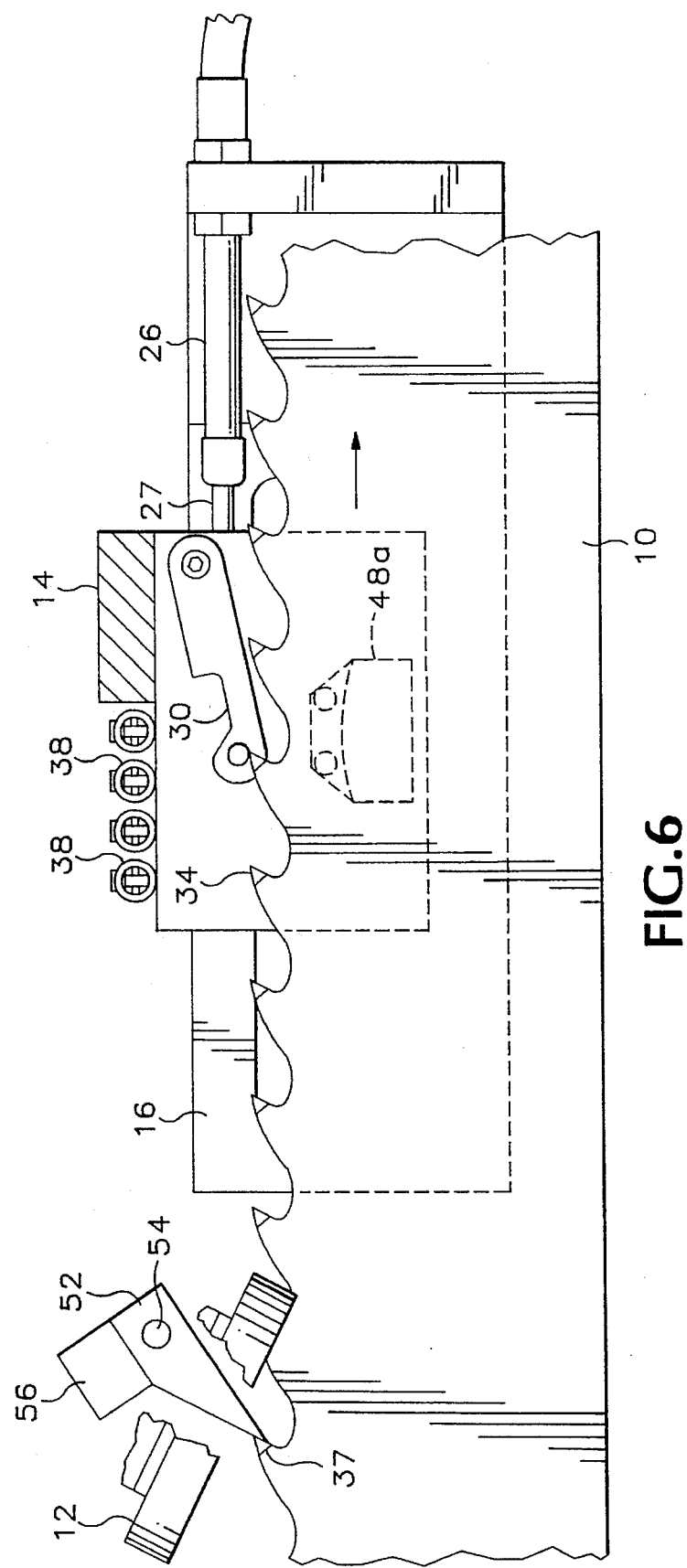
FIG. 6 is a view similar to FIG. 4 showing the reverse stroke of the indexing block.

The indexing block includes a pawl 30 (shown in dashed outline on FIG. 1) which engages the scalloped area 32 behind a carbide tipped saw blade tooth 34 (refer to FIGS. 4, 5 and 6).

As best shown in FIG. 2 the indexing block 14 is in two pieces that are coupled together by a swivel bolt 36. The degree of force used to hold the two halves of the block together is provided by springs 38 which may be similar to bed springs. The tension force of the springs 38 may be regulated by the placement of anchor pins 40 into holes 42. In order to open the indexing block 14 along its swivel axis 36 an air cylinder 44 is provided which includes a piston 46.

Referring to FIG. 3, inside the indexing block 14 are friction pads 48a and 48b that grip the blade 10 from either side. An adjustment screw 50 is provided on the air cylinder side of the indexing block which may be used to adjust the position of the friction pad 48a.

The operation of the invention is best shown by reference to FIGS. 4, 5 and 6. FIG. 4 shows the saw blade 10 held in position for a grinding operation. In this position an index finger 52 has engaged a tooth 35. The tooth 35 has been pulled back against the index finger 52 by the indexing block 14 as will be explained below. Once the grinding operation is completed the grinding wheels 12 withdraw and the wire link 26 pushes the indexing block 14 forward. Since the pawl 30 has engaged the scalloped tooth area 32 the saw blade 10 is pushed along its track or guide in the direction indicated by the arrow in FIG. 5. The index finger 52 is free to rotate about a pin 54 and is biased in a downward direction by a counterweight 56. As the blade is pushed forward the index finger 52 will ride across the top of the next tooth 37 and fall into the scalloped area immediately behind it. This position is shown in both FIGS. 4 and 6. The index finger falls behind a saw blade tooth at the end of the forward stroke the length of which determined by the wire link 26 which is adjusted for the proper inter-tooth distance. Once this occurs the wire link pulls on the indexing block 14 with a reverse stroke as indicated by the arrow in FIG. 6. Because the friction pads tightly grip the blade 10, under the tension of the springs 38, the indexing block 14 will pull the blade so that the tooth 37 is forced against the index finger 52 which rests behind the tooth 37 in its scalloped area. The saw blade will stop when the finger 52 engages the tooth 37 but the indexing block will continue to move in the reverse direction because the friction pads 48a and 48b will slide along the surface of the blade 10. In other words, the frictional force imparted to the friction pads by the tension of the springs 38 is made high enough to grip the blade so as to force it backwards to engage the index finger tightly but not so tight as to impede the reverse progress of the indexing block which is being positioned to execute the next forward stroke. As FIG. 6 shows, movement in the direction of the arrow by the indexing block 14 will cause the pawl 30 to drop into the scalloped area of the tooth next adjacent tooth 34. With the rearward stroke completed, the indexing system will be in the position illustrated in FIG. 4 and the grinding wheels will execute a grinding stroke. After this the process described above repeats until all teeth of the saw 10 have been sharpened.

Many modifications of the above invention are possible without departing from the spirit of the invention. For example, other motive means besides a wire link could be used to move the indexing block reciprocally along its frame 16. These include a cam and tie rod arrangement, a pneumatic cylinder or any other type of motor driven piston arrangement. In addition, the tension of the friction pads 48a and 48b could be adjusted in many different ways. For example, bolts could be used to simply join two halves of the indexing block together with the screw type adjustment for adjusting the proper amount of friction between the friction pads and the blade 10.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a bandsaw sharpening machine including at least one grinding wheel for engaging the teeth of a bandsaw blade an indexing system comprising:

(a) an indexing block slideably disposed with respect to a frame and including a pawl for engaging the blade to push the blade in a forward direction;

(b) friction pads affixed to said indexing block for frictionally engaging the sides of the bandsaw blade;

(c) link means for reciprocally moving the indexing block with a forward stroke and with a reverse stroke; and (d) an index finger for engaging a tooth of the blade after said forward stroke to hold the blade stationary while the link means retracts the indexing block with said reverse stroke.

2. The indexing system of claim 1 wherein the position of at least one of said friction pads relative to a side of the bandsaw blade is adjustable.

3. The indexing system of claim 1 wherein the indexing block includes two members disposed one on each side of the saw blade, the members being connected by at least one tensioning spring to regulate friction on the blade imparted by the friction pads.

4. The indexing system of claim 3 wherein the tensioning spring is adjustable.

5. The indexing system of claim 1 wherein the link means comprises a stiff wire push rod.

6. The indexing system of claim 1 wherein said indexing block is slideably mounted to a frame, said frame being affixed to said bandsaw sharpening machine wherein said frame includes a slot for permitting reciprocal movement of said block.

* * * * *